United States Patent
Rindoks et al.

(10) Patent No.: US 6,290,202 B1
(45) Date of Patent: Sep. 18, 2001

(54) APPARATUS FOR MOLDING THIN RESIN SHEETS

(75) Inventors: Kurt P. Rindoks, Davidson; David K. Foote, Morganton, both of NC (US)

(73) Assignee: Kewaunee Scientific Corporation, Statesville, NC (US)

( * ) Notice: Subject to any disclaimer, the term of this patent is extended or adjusted under 35 U.S.C. 154(b) by 0 days.

(21) Appl. No.: 09/496,440

(22) Filed: Feb. 2, 2000

Related U.S. Application Data

(62) Division of application No. 08/975,125, filed on Nov. 20, 1997, now abandoned.

(51) Int. Cl.$^7$ ................................................ B29C 51/38
(52) U.S. Cl. .................... 249/129; 249/139; 249/171; 425/186; 425/453; 425/DIG. 201
(58) Field of Search ................................ 249/129, 170, 249/171, 78, 79, 139; 425/174.4, DIG. 200, DIG. 201, 186, 453

(56) References Cited

U.S. PATENT DOCUMENTS

| | | | |
|---|---|---|---|
| 327,546 | 10/1885 | Hansen | 249/105 |
| 415,332 | 11/1889 | Payen | 249/110 |
| 1,430,763 | 10/1922 | Sivertson | 249/129 |
| 2,066,726 | 1/1937 | Goldschmidt et al. | 264/232 |
| 2,154,639 | 4/1939 | Rohm et al. | 264/313 |
| 2,328,525 | 8/1943 | Egolf | 264/331.18 |
| 3,165,786 * | 1/1965 | Yagi et al. | 249/81 |
| 3,177,089 | 4/1965 | Marshall et al. | 428/416 |
| 3,257,484 * | 6/1966 | Barnette | 249/170 |
| 3,594,460 | 7/1971 | Rechter et al. | 264/48 |
| 3,668,031 * | 6/1972 | Bast | 156/79 |
| 3,694,129 | 9/1972 | Daddona | 425/401.5 |
| 3,740,513 | 6/1973 | Peters, Jr. et al. | 219/622 |
| 3,792,832 * | 2/1974 | Shelley | 249/170 |
| 3,816,234 | 6/1974 | Winfield | 428/317.9 |
| 3,846,525 * | 11/1974 | Kinne et al. | 425/123 |
| 3,994,763 * | 11/1976 | Sheath et al. | 156/182 |
| 4,083,743 | 4/1978 | Degens | 156/278 |
| 4,439,392 * | 3/1984 | Schutzler et al. | 425/128 |
| 4,505,974 | 3/1985 | Hosler | 428/329 |
| 4,543,290 | 9/1985 | Brooker et al. | 428/336 |
| 4,910,073 | 3/1990 | Tamura et al. | 428/215 |
| 4,923,908 | 5/1990 | Lostumo et al. | 523/220 |
| 4,969,811 * | 11/1990 | Littleton | 249/170 |
| 4,999,246 * | 3/1991 | Jechel et al. | 428/192 |
| 5,039,291 * | 8/1991 | Iwasawa et al. | 249/171 |
| 5,234,743 | 8/1993 | Fleischle | 428/195 |

(List continued on next page.)

FOREIGN PATENT DOCUMENTS 24 17 475-A1 * 10/1975 (DE) .
24 39 968-A1 * 3/1976 (DE) .

OTHER PUBLICATIONS

Slocum, Donald H., The Future of Thermoset Products, Part 1, *Cast Polymer Connection*, vol. VI, 1997, pp. 30–35.

*Primary Examiner*—Nam Nguyen
*Assistant Examiner*—Thu Khanh T. Nguyen
(74) *Attorney, Agent, or Firm*—Alston & Bird LLP

(57) ABSTRACT

A mold (10) for molding thin resin sheets includes a center mold plate (12) and two side mold plates (14, 16) disposed on opposite sides of the center mold plate. The mold plates are oriented generally vertically and parallel to each other, and the side mold plates are narrowly spaced from the center mold plate to define a pair of generally vertical mold cavities (18, 20) on either side of the center mold plate. The side mold plates may optionally include recesses (51) in their generally planar mold surfaces (38, 40) adjacent at least one longitudinal edge of the plate, for molding thin resin sheets with integral edge flanges. The mold includes spacer strips (46, 47) for spacing the side mold plates a precise distance from the center mold plate and parallel thereto. The mold thus permits molding of thin resin sheets having precisely controlled uniform thickness.

15 Claims, 5 Drawing Sheets

U.S. PATENT DOCUMENTS

| | | | |
|---|---|---|---|
| 5,266,384 | 11/1993 | O'Dell et al. | 428/207 |
| 5,354,939 | 10/1994 | Hollstein et al. | 523/206 |
| 5,451,362 | 9/1995 | Wombwell et al. | 264/328.6 |
| 5,470,217 * | 11/1995 | Liliental, II et al. | 249/170 |
| 5,505,895 | 4/1996 | Bull et al. | 264/327 |
| 5,524,861 * | 6/1996 | Solomon | 249/170 |
| 5,570,939 | 11/1996 | Scott | 312/229 |

* cited by examiner

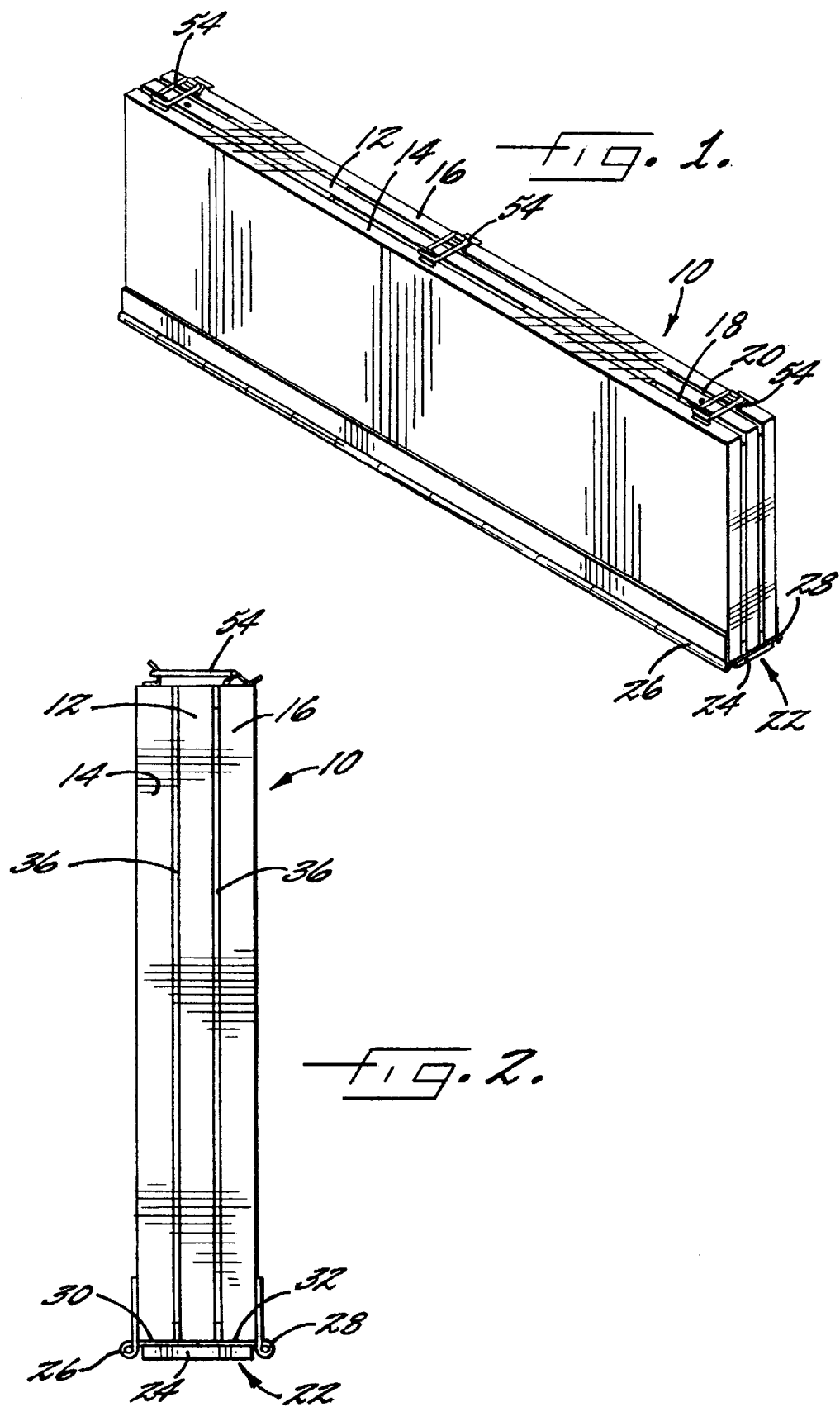

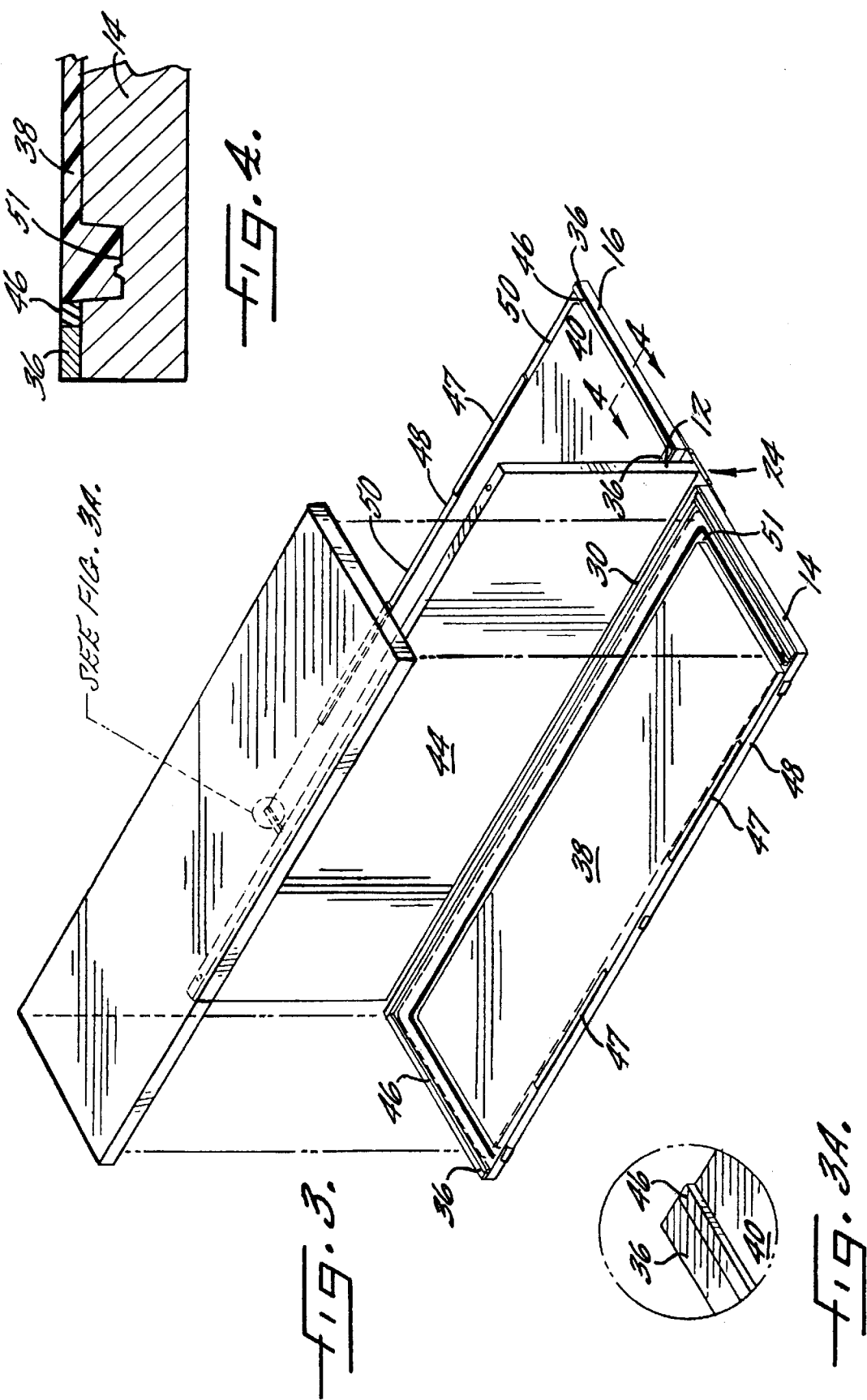

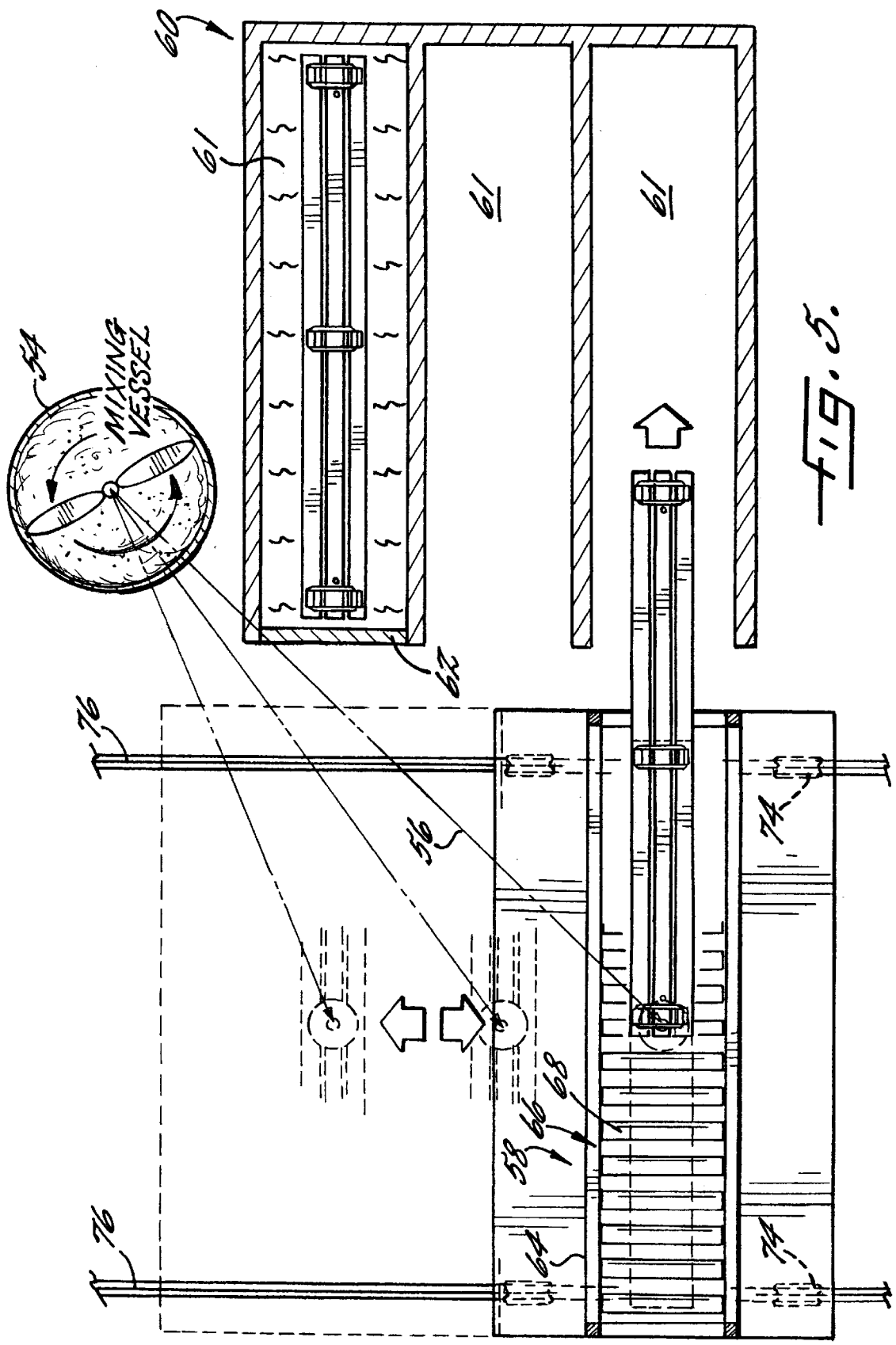

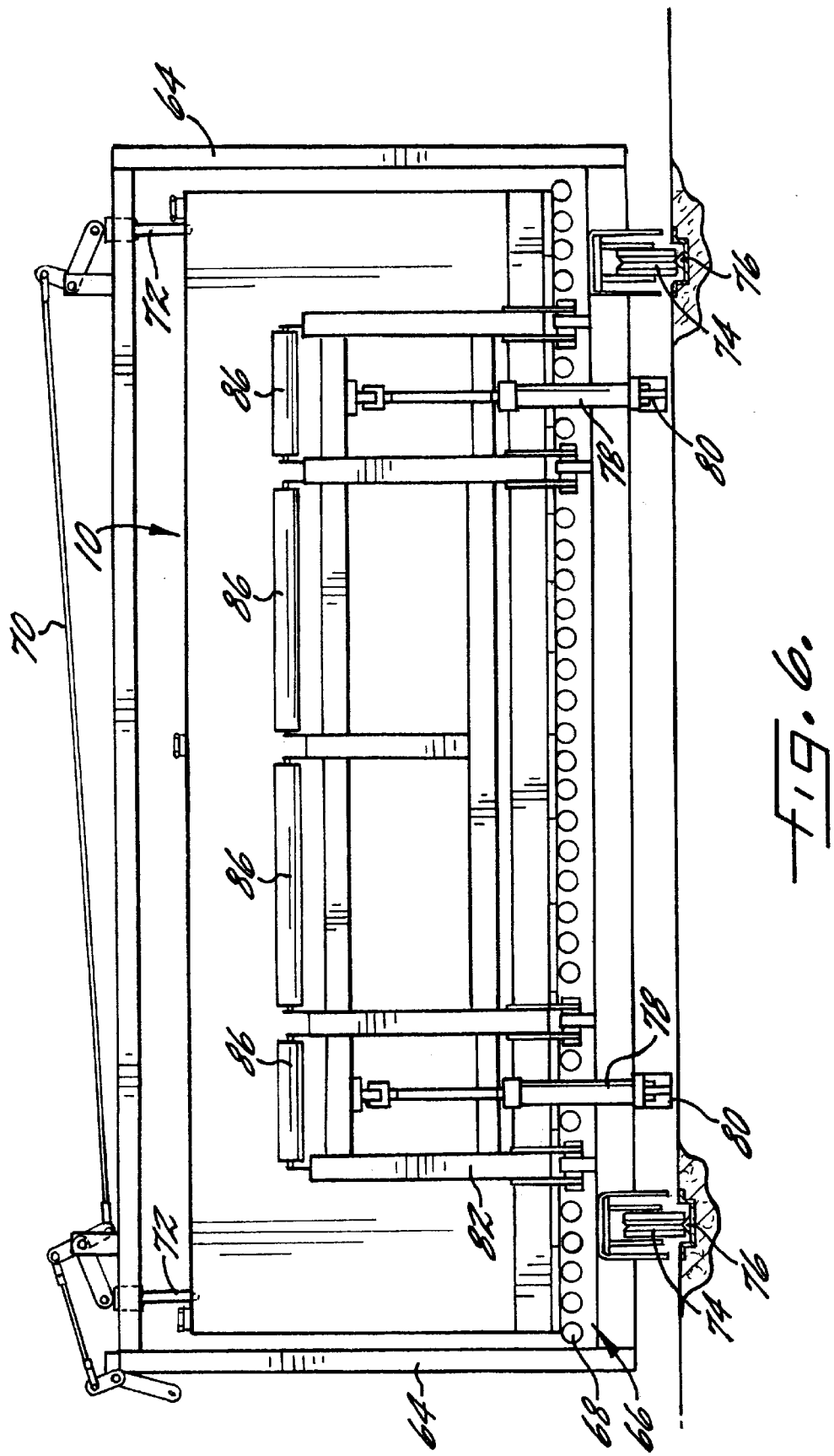

APPARATUS FOR MOLDING THIN RESIN SHEETS

CROSS-REFERENCE TO RELATED APPLICATIONS

This application is a divisional of U.S. application Ser. No. 08/975,125, filed Nov. 20, 1997 now abandoned.

FIELD OF THE INVENTION

This invention relates to the molding of thin sheets of a resin composition and, more particularly, to methods and apparatus for molding thin resin sheets of substantially constant thickness.

BACKGROUND OF THE INVENTION

Countertops for use in laboratories must withstand severe environmental conditions. They must be resistant to strong chemicals such as solvents, acids and corrosive compositions, and they must also withstand severe physical conditions such as impacts and localized heating without breaking or cracking. The countertop must have a smooth, impermeable surface which is easy to clean. To meet these demanding performance requirements, many laboratory countertops have been formed from an epoxy composition. Typically, the countertop comprises a thick slab of cured epoxy resin containing a mineral filler. The slabs are cast in thicknesses of approximately 1 inch to 1½ inches, in lengths of up to 8 feet and in widths of up to 4 feet. Epoxy countertops of this general type have performed quite well under the demanding environmental conditions encountered in laboratories, and have been used extensively. Indeed, this type of countertop is used in most academic and industrial laboratory countertop installations. However, a drawback to this type of countertop is that it is quite heavy. A typical epoxy countertop slab may weigh 10 pounds or more per square foot. Thus, the material cost and shipping expense is significant and the weight also makes handling and installation difficult.

Thinner sheets of an epoxy composition on the order of about ¼ to ⅜ inch thick have been produced for use in less demanding installations, for example as liners for fume hoods, by casting in an open horizontal mold. However, this method is incapable of meeting the exacting dimensional tolerances and flatness requirements of countertop applications. Also, the requirements for impact resistance and heat resistance are less severe in fume hood liner applications than in countertop applications.

Other methods which have been proposed for producing thin resin sheet materials include pressure gelation and compression molding. However, these methods have drawbacks or limitations which make them impractical or uneconomical for countertop applications.

SUMMARY OF THE INVENTION

The present invention provides methods and apparatus for molding thin sheets of a thermosetting resin composition in relatively large sizes and with substantially constant thickness so as to be suitable for use as upper exposed surfaces of laboratory countertops or the like. In accordance with one broad aspect of the present invention, the thin resin sheet is produced in a closed vertical mold. The method comprises forming a castable liquid composition comprising a thermosetting resin, positioning a pair of generally planar mold plates in a vertical orientation in opposing parallel relationship and narrowly spaced apart from each other to form a narrow vertical mold cavity therebetween, and introducing the castable liquid composition into the mold cavity and allowing the composition to flow by gravity to fill the mold cavity. The castable liquid composition is cured and hardened in the mold cavity to produce a resin sheet and the sheet is then removed from the mold cavity. In a preferred embodiment of the invention, the castable liquid composition is cured and hardened by heating the composition in the mold at an elevated temperature. For example, the heating may be accomplished by placing the mold in an oven at a temperature of at least 250° F.

In a further and more specific aspect, the method of the present invention entails positioning a pair of planar rigid generally vertically oriented walls in opposed relationship narrowly spaced apart from one another to form a narrow generally vertical closed mold cavity, forming a mixture of a liquid epoxy resin, mineral filler and epoxy resin hardener, and filling the mold cavity with the mixture. Curing of the resin mixture is initiated by heating the mixture in the mold cavity, thereby producing a hardened resin panel. Preferably, to facilitate filling of the narrow mold cavity without voids, the mold walls are preheated prior to filling the mold cavity. This reduces the viscosity of the epoxy resin mixture and allows it to more readily fill the mold cavity.

An apparatus for molding thin resin sheets in accordance with the invention comprises a mold including at least first and second generally planar mold plates which are oriented generally vertically and spaced apart to define a generally vertical mold cavity between the plates. More specifically, the mold plates have opposing generally planar surfaces that are parallel to each other and narrowly spaced apart from one another. The mold plates are supported by a mold support, the second mold plate preferably being movably supported so as to be movable into an open position permitting a hardened resin sheet to be removed from the mold. The mold preferably also includes a spacer strip which projects outwardly from the generally planar surface of one of the plates and abuts the generally planar surface of the other plate when the mold is closed. The spacer strip extends along at least lower and side edges of the one of the plates so as to define a substantially closed mold cavity bounded by the spacer strip, while accurately and uniformly holding the mold plates in spaced apart relation.

In one embodiment, the apparatus includes a third mold plate, the first mold plate being disposed between the second and third mold plates. The third mold plate is oriented generally vertically and narrowly spaced from the first mold plate so as to define a second narrow generally vertical mold cavity therebetween. Both the second and third mold plates preferably are pivotally connected to the mold support so as to be movable into open positions. The second mold cavity also includes a spacer strip which bounds the cavity. The spacer strips of the two mold cavities preferably are integrally formed with the second and third mold plates.

For molding thin resin sheets having integral edge flanges, which give the appearance of a solid slab having the thickness of the flange, the apparatus preferably includes a recess in at least one of the generally planar surfaces of the second and third mold plates, the recess extending along at least one of the edges of the respective mold cavity. The recess has a bottom surface which is generally planar and parallel to the opposing generally planar surface of the first mold plate. The recess thus defines an enlarged mold cavity which adjoins the respective narrow mold cavity. When the mold is filled with a curable composition, the enlarged mold cavity is also filled, such that the resulting resin sheet has an integral edge flange.

In accordance with another aspect of the invention, an apparatus for molding thin resin sheets includes a mold having a pair of generally planar mold plates which are oriented generally vertically and parallel to each other and spaced apart to form a generally vertical mold cavity therebetween. The mold includes an opening into the mold cavity along an upper edge thereof for pouring heat-curable composition into the mold cavity. The apparatus further includes a heater for heating the mold after the heat-curable composition has been poured into the mold. The heater is adapted to heat the mold while the mold is in a generally vertical orientation. The heater may be an oven into which the generally vertical mold is placed to effect heating of the mold to cure the composition. Alternatively, the heater may comprise an infrared heater, an electrical resistance heater, or heat transfer fluid circulated through fluid passageways in the mold plates. The apparatus may also include a vacuum mixer adapted to mix the heat-curable composition while under vacuum so as to remove gases from the composition prior to pouring into the mold.

BRIEF DESCRIPTION OF THE DRAWINGS

Some of the features and advantages of the invention having been described, others will become apparent from the detailed description which follows, and from the accompanying drawings, in which:

FIG. 1 is a schematic perspective view showing a mold apparatus for producing thin resin sheets;

FIG. 2 is an end view of the mold apparatus of FIG. 1;

FIG. 3 is a perspective view of the mold apparatus of FIG. 1, but showing the mold in an open condition to allow removal of the molded resin sheets;

FIG. 3A is an enlarged fragmentary view showing the spacer strip along one side edge of the mold plate;

FIG. 4 is a cross-sectional view taken on line 4—4 of FIG. 3, showing an enlarged mold cavity along the edge of the narrow mold cavity for producing a thin sheet with an integral edge flange;

FIG. 5 is a schematic top view of a manufacturing line for molding thin resin sheets, including a mixing vessel, vertical molds, a mold transport device, and an oven;

FIG. 6 is a side elevational view of the mold transport device; and

DESCRIPTION OF ILLUSTRATED EMBODIMENTS

Figure 7:
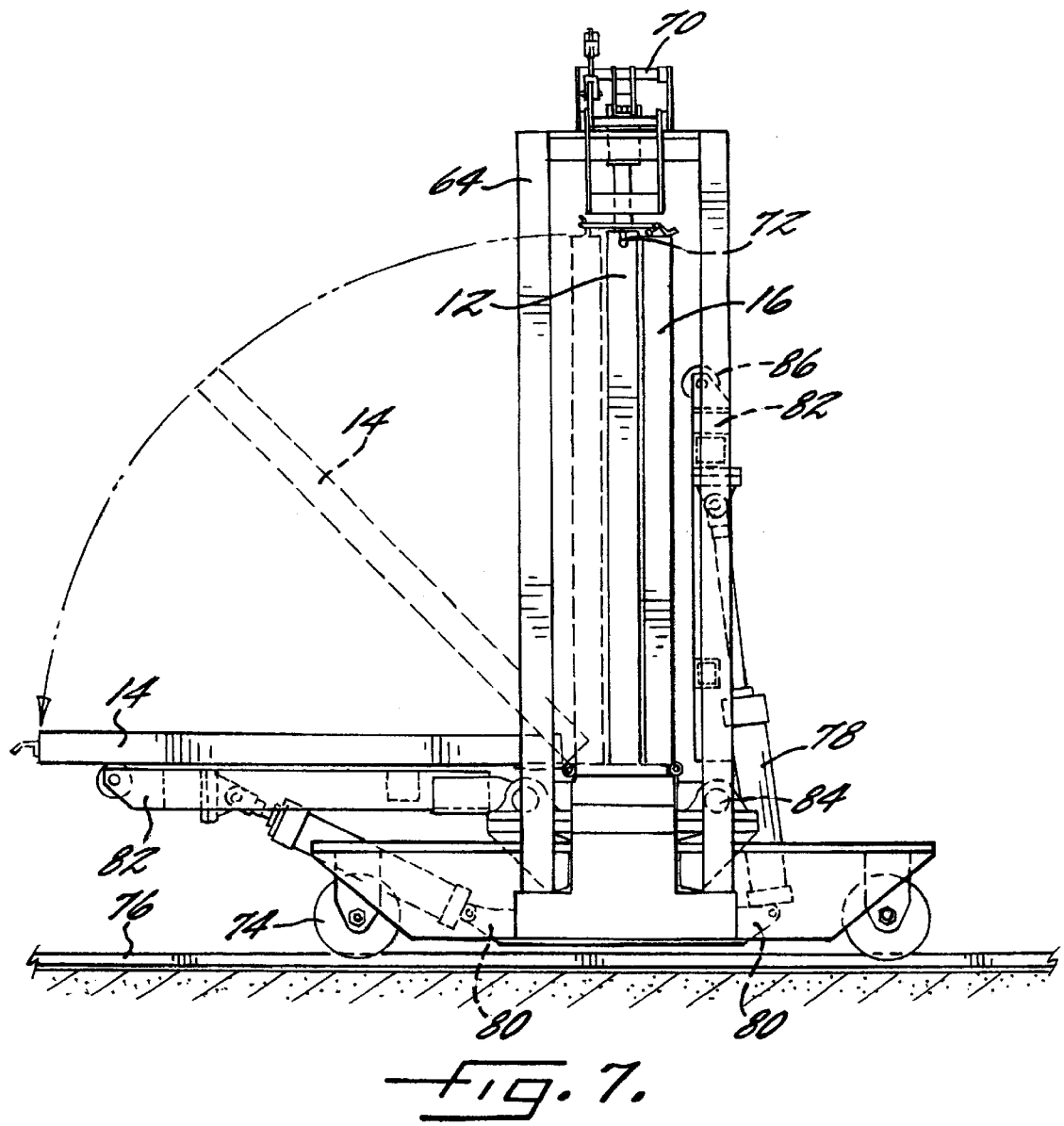
FIG. 7 is an end elevational view of the mold transport device with a mold in position thereon, showing one side of the mold in an open position and illustrating in phantom an intermediate position of the hinged mold plate as the transport device moves the plate between an open and a closed position.

FIG. 1 depicts a mold 10 in accordance with the principles of the invention. The mold 10 includes a generally vertically oriented center mold plate 12 and two generally vertically oriented side mold plates 14 and 16 which are disposed on opposite sides of the center mold plate 12. The mold plates 14 and 16 are parallel to center mold plate 12 and are narrowly spaced apart from the center mold plate. Although the mold 10 could be used for forming relatively thick resin sheets or panels, it is especially designed and suited to permit molding of relatively thin resin sheets with precise dimensional tolerances in thickness to permit the resin sheets to be used as a thin overlay over a lighter and less costly backing or support. For example, for producing resin sheets for countertop applications or for thin sheeting, it is desirable to have a sheet thickness of about ½ inch or less, e.g. about ⅜ inch or ¼ inch in thickness. For producing resin sheets of these dimensions, the mold plates may be spaced apart from one another a corresponding distance, e.g. ½ inch, ⅜ inch or ¼ inch, thus defining a pair of generally vertical narrow mold cavities 18 and 20 on opposite sides of center mold plate 12. The mold 10 is thus substantially symmetrical about the mid-plane of center mold plate 12. Nevertheless, it will be appreciated that there is no requirement that the two mold plates 14 and 16 be identical mirror images of each other, and it may be advantageous to employ different configurations of the two mold plates 14 and 16 for simultaneously molding two different configurations of resin sheets.

FIG. 2 depicts an end view of the mold 10 which better shows the manner in which the mold plates are supported. More specifically, the mold 10 includes a mold support 22 upon which the three mold plates 12, 14, and 16 are supported. The mold support 22 includes a base support plate 24 and a pair of hinges 26 and 28. The hinge 26 is attached to the base support plate 24 and to the side mold plate 14 adjacent its lower edge 30, and the hinge 28 is likewise attached to the base support plate 24 and to the side mold plate 16 adjacent its lower edge 32. The center mold plate 12 is supported in a fixed generally vertical position by the mold support 22. The hinges 26 and 28 thus permit the side mold plates 14 and 16 to be pivoted from closed positions as shown in FIGS. 1 and 2 in which the three mold plates 12, 14, and 16 cooperate to form the two closed mold cavities 18 and 20, to open positions as shown in FIG. 3 to allow removal of resin sheets from the mold.

With further reference to FIG. 3, a spacer strip 36 is mounted on the generally planar surfaces 38 and 40 of side mold plates 14 and 16, respectively, along the bottom edges 30 and 32 and along opposite side edges 42 of the side mold plates 14 and 16. The spacer strips 36 abut the opposing generally planar surfaces 44 of the center mold plate 12 when the mold is closed. The spacer strips 36 have a thickness corresponding to the intended thickness of the molded resin sheets. For example, for producing a sheet ¼ inch in thickness, the spacer strip 36 has a thickness of ¼ inch and thus serves as a spacer for accurately spacing the side mold plates 14 and 16 from the center mold plate 12 a uniform distance to provide the precise thickness tolerances required in accordance with the present invention. The spacer strip 36 also serves to seal the mold cavity. The length and width dimensions of the mold plates are many times greater than the thickness dimension, enabling the mold to produce sheets having a width of at least 50 times the thickness, or even 100 times the thickness or higher, and a length dimension at least 100 times the thickness, or even 250 times the thickness or higher. A flexible seal 46 is mounted alongside the spacer strip 36 to facilitate obtaining a tight seal with the surface of the center mold plate 12 when the mold is in the closed position.

A spacer strip 47 is also mounted alongside the top edges 48 of the side mold plates 14, 16 for spacing the side mold plates 14, 16 from the center mold plate 12 in this location. However, as shown, the spacer strips 47 do not run the entire length of the mold plate. Thus, pour openings 50 are left along the top edge of the mold for filling the mold with resin.

FIG. 4 illustrates an optional feature of the side mold plates 14 and 16 which allows resin sheets with integral edge flanges to be produced. A recess or cavity 51 is provided in the generally planar surface 38 of the side mold plate 14, it being understood that side mold plate 16 similarly may include such a recess. In the illustration given in FIG. 4, however, the side mold plate 16 is designed for forming a flat panel of uniform thickness throughout and the mold plate 16 is therefore not provided with a recess 51. The mold plate 14 on the other hand is provided with a longitudinal recess 51 along the lower edge 30, the recess 51 forming an integral edge flange in the resulting resin sheet produced in the mold cavity 18.

The generally planar surfaces 44 of the center mold plate 12 are preferably smooth for producing resin sheets with a smooth upper surface. If a textured surface is desired on the lower surfaces of the sheets, the generally planar surfaces 38 and 40 of the side mold plates 14 and 16 may be lined with a textured sheet, such as a Teflon coated woven fabric or by imparting a texture to the mold surface itself.

In use, the mold 10 is closed by pivoting the side mold plates 14, 16 to their upward position and clamping the mold plates in position using a suitable clamping device, such as clamps 54 as shown in FIGS. 1 and 2. Prior to filling the mold, the mold is preferably preheated to an elevated temperature, for example 300° F. Using a trough-type funnel (not shown), a castable liquid resin molding composition is introduced into the fill openings 50 at the top of the mold, and the molding composition flows downwardly by gravity to completely fill the mold. Optionally, vacuum can be applied to the mold cavity to assist in filling the mold with the liquid molding composition. Once the mold is full, it is heated to promote curing of the resin mixture. For example, the mold may be placed in an oven at a temperature of at least 250° F., preferably about 320° F., for 2 hours. Afterwards, the mold is removed from the oven and opened and the epoxy resin countertop is removed from the mold. The countertop may be allowed to cool fully within the mold, or it may be removed from the mold while still warm and somewhat flexible and placed on a flat surface where it is allowed to cool slowly until it is fully hardened. At this point, the countertop should be ready for subsequent processing.

The particular molding composition used for molding thin resin sheets in the mold 10 will generally be selected in accordance with the types of conditions the sheets must withstand in use. For instance, in order to provide the high levels of chemical resistance, hardness, impact tolerance, and heat resistance required for laboratory installations, surfacing panels made in accordance with the invention are formed of a strong heat-resistant thermoset resin composition. Epoxy resins are particularly preferred for this purpose, providing a combination of high strength, toughness, chemical resistance, and adhesive and electrical properties. Examples of suitable compositions include liquid bisphenol-A (bis A) epoxy resins, liquid epoxy novolac resins, vinyl ester resins, and the like. The molding composition preferably also includes a particulate mineral filler for imparting desired properties to the composition, such as increased pot life, decreased exotherm, decreased coefficient of thermal expansion, and decreased shrinkage upon curing. Various mineral fillers may be used for these purposes, including alumina, silica, talc, clay, crushed stone, calcium carbonate, magnesium hydrate, and others.

FIG. 5 schematically depicts a manufacturing line for molding thin resin sheets in accordance with the invention. The components of a heat-curable epoxy composition are placed into a mixer 54 and mixed thoroughly. Preferably the mixer 54 is a vacuum mixer which is capable of placing the contents of the mixer under a vacuum during the mixing process in order to remove air bubbles or other gases from the composition prior to molding. After mixing, the com-position is poured into the mold 10 as indicated by arrow 56. The mold 10 is then transported by a mold transport device 58 to an oven 60, where the mold 10 is conveyed through the open oven door 62 into the interior of the oven 60. The oven 60 may have multiple bays 61 for simultaneously heating more than one mold 10, with each bay 61 having its own door 62 which can be opened and closed, e.g. by sliding vertically. Once a mold 10 is in one of the bays 61, the oven door 62 is then closed and the mold 10 is allowed to remain in the oven 60 for the desired cure time. While the mold 10 is curing in one of the bays 61 of the oven 60, a second mold 10 may be loaded on mold transport device 58, filled with molding composition, and transported and rolled into another of the bays 61. At the end of the curing time, the mold 10 is conveyed from the oven 60 back onto the transport device 58. The mold 10 is then opened and the sheets are removed.

The mold transport device 58 includes features facilitating the conveying of the mold into the oven as well as the opening and closing of the mold. Thus, the transport device 58 comprises a frame structure 64 which supports a horizontal elongated roller conveyor 66. The mold 10 rests with the mold base support plate 24 on the rollers 68 of the roller conveyor 66. The frame structure 64 supports a linkage 70 including a pair of pins 72 which can be extended and retracted by operation of the linkage 70. In their extended positions, the pins 72 extend into depressions in the mold 10 so as to hold the mold 10 in a vertical position on the device 58 and restrain the mold 10 from rolling along the roller conveyor 66. The device 58 includes wheels 74 which preferably are adapted to roll on rails 76. When the mold 10 is to be placed into the oven 60, the transport device 58 is rolled to the oven 60, the linkage 70 is operated to disengage the pins 72 from the mold 10, and the mold 10 is rolled on the rollers 68 into the oven 60. The oven 60 may also include a roller conveyor (not shown) mounted internally at about the same level as the roller conveyor 66 to facilitate movement of the mold 10 into and out of the oven 60.

To facilitate opening and closing of the mold, the transport device 58 includes hydraulic actuators 78 which can be extended to move the mold plates 14 and 16 into the closed positions and retracted to move the plates into open positions. Hydraulic actuators 78 are attached on each side of the transport device 58 between a bottom bracket 80 of the transport device and a lift mechanism 82 which rotates about a horizontal axis 84 between a horizontal position and a vertical position. With the lift mechanism 82 in the horizontal position as shown on the left side of FIG. 7, the hydraulic actuators 78 are inclined upwardly from their lower attachment points at bottom bracket 80 to their upper attachment points at lift mechanism 82. The pivot axis 84 of lift mechanism 82 is at a higher vertical level than the lower ends of the actuators 78 and is horizontally offset from the lower ends of the actuators 78 in the direction of the center mold plate 12. Thus, upon extension of the hydraulic actuators 78, the lift mechanism 82 is subjected to a force having a vertical component, and accordingly the open mold plate 14 is rotated toward the closed position. The actuators 78 are pivotally attached to bracket 80 and lift mechanism 82 to allow relative rotation therebetween as the mold plates are opened and closed. The lift mechanisms 82 include rollers 86 which contact the respective mold plates 14 and 16 and ride along the outer surfaces of the plates as they are rotated open and closed.

The invention thus provides an apparatus and method for molding precisely dimensioned thin resin sheets. The resin sheets produced by apparatus and method are void-free and substantially homogeneous throughout. While the invention has been described by reference to a specific embodiment which has been described in considerable detail, the invention is not limited to the specific embodiment and illustrative apparatus and method described. Those of ordinary skill in the art will recognize that the illustrative embodiment is susceptible to various modifications which are within the scope of the present invention. Accordingly, the scope of the invention is to be determined by reference to the following claims interpreted in light of the general principles of the invention as explained above.

That which is claimed is:

1. An apparatus for molding thin resin sheets of substantially constant thickness, comprising:

a mold support;

first and second mold plates oriented vertically and spaced apart on the mold support, the mold plates each having a planar surface opposing the other mold plate, the opposing surfaces being parallel to each other and narrowly spaced apart to form a narrow vertical mold cavity therebetween, the first mold plate being rigidly affixed to the mold support and the second mold plate being movably affixed to the mold support so as to be movable away from the first mold plate for providing access to a completed resin sheet in the mold cavity;

a first spacer strip affixed to one of the mold plates and projecting from said surface of said one of the mold plates and extending continuously along lower and side edges thereof for abutting the opposing surface of the other mold plate, the first spacer strip serving to space the mold plates apart a predetermined distance and also serving to define a substantially closed vertical mold cavity between the plates and bounded by the spacer strip, and wherein the first spacer strip extends along an upper edge of said one of the plates and includes at least one gap at the upper edge defining a pour opening into the mold cavity for pouring a castable composition into the mold;

a third mold plate, the first mold plate being disposed between the second and third mold plates, the first and third mold plates including respective planar surfaces which confront each other in parallel relationship to define a second narrow vertical mold cavity, wherein each of the second and third mold plates is pivotally attached to the mold support for pivotal movement with respect to the first mold plate, the second and third mold plates thereby being movable between closed positions parallel to the first mold plate and open positions permitting hardened resin sheets to be removed from the mold cavities.

2. The apparatus of claim 1, further comprising:

a second spacer strip disposed between the first and third mold plates, the first and second spacer strips defining lower, side, and upper edges of each of the mold cavities, each spacer strip including at least one gap along the upper edge of the respective mold cavity, the gaps defining fill openings into the mold cavities to allow introducing castable composition into the mold cavities when the mold cavities are closed.

3. The apparatus of claim 2, wherein the first and second spacer strips are carried by the second and third mold plates, respectively, and abut the planar surfaces of the first mold plate when the second and third mold plates are in their closed positions.

4. The apparatus of claim 2, wherein at least one of the second and third mold plates includes a recess in the planar surface thereof, the recess extending along at least one of the edges of the respective mold cavity, the recess having a planar bottom surface which is parallel to the opposing planar surface of the first mold plate and is spaced therefrom by a distance of at least one inch, the recess thereby defining an enlarged mold cavity adjoining the respective narrow mold cavity for producing resin sheets having integral edge flanges.

5. Apparatus for molding thin resin sheets, comprising:

a mold support a mold including first, second, and third mold plates disposed in a vertical orientation and parallel to each other and spaced apart to form a first vertical mold cavity between one planar surface of the first mold plate and a planar surface of the second mold plate and a second vertical mold cavity between an opposite planar surface of the first mold plate and a planar surface of the third mold plate, the mold including an opening into each mold cavity along an upper edge thereof for pouring heat-curable composition into the mold cavity, the first mold plate being affixed to the mold support in a fixed vertical position and the second and third mold plates each being pivotally attached to the mold support so as to be movable between a vertical position parallel to the first mold plate and a non-vertical position pivoted away from the first mold plate; and a heater for heating the mold after the heat-curable composition has been poured into each mold cavity, the heater being adapted to heat the mold while the mold is maintained in said vertical orientation.

6. The apparatus of claim 5, wherein the heater comprises an oven into which the generally vertical mold is placed.

7. The apparatus of claim 5, wherein the heater comprises an infrared heater which exposes the mold to infrared radiation to effect heating of the mold.

8. The apparatus of claim 5, wherein the heater comprises a fluid passageway in the mold plates and means for circulating a heat transfer fluid through the fluid passageway.

9. The apparatus of claim 5, wherein the heater comprises an electrical resistance heater which is in heat-exchanging relationship with the mold.

10. The apparatus of claim 5, further comprising:

a vacuum mixer for mixing a heat-curable composition, the mixer being adapted to place the composition under vacuum to degas the composition prior to pouring into the mold.

11. The apparatus of claim 5, wherein the mold plates are spaced apart by a distance of up to about ½ inch.

12. Apparatus for molding thin resin sheets, comprising:

a mold including first, second, and third mold plates disposed in a vertical orientation and parallel to each other and spaced apart to form a first vertical mold cavity between one planar surface of the first mold plate and a planar surface of the second mold plate and a second vertical mold cavity between an opposite planar surface of the first mold plate and a planar surface of the third mold plate, each of the second and third mold plates being pivotable away from the first mold plate to provide access to each mold cavity; and a mold transport device adapted to support and transport the mold in said vertical orientation along a manufacturing line, the transport device including a wheeled base upon which the mold rests, a restraining member which engages the mold to hold the mold in said vertical orientation on the base, and a lift mechanism which is actuatable to rotate each of the second and third mold plates between a closed position parallel to the first mold plate and an open position providing access to the respective mold cavity.

13. The apparatus of claim 12, wherein the lift mechanism includes one hydraulic actuator having a lower end connected to the base and an upper end connected to an engaging member which contacts an outer surface of said second mold plate and another hydraulic actuator having a lower end connected to the base and an upper end connected to another engaging member which contacts an outer surface of said third mold plate, each actuator being selectively variable in length between a retracted length in which the respective pivotable mold plate is permitted to move into the open position and an extended length in which said mold plate is moved by the engaging member into the closed position.

14. The apparatus of claim 13, wherein the first mold plate remains in vertical orientation when the pivotable mold plates are moved into the open position on the transport device, and the restraining member comprises a pin which engages a receptacle in the first mold plate.

15. The apparatus of claim 12, wherein the transport device further comprises a roller conveyor forming the portion of the base upon which the mold rests, the roller conveyor permitting the mold to be rolled in said vertical orientation off an end of the transport device to a work station of the manufacturing line.

* * * * *